Patented May 7, 1935

2,000,117

UNITED STATES PATENT OFFICE 2,000,117

OESTRUS EXCITING PRODUCT AND PROCESS OF PRODUCING SAME

Selmar Aschheim, Berlin-Charlottenberg, Germany, assignor to Schering-Kahlbaum A. G., Berlin, Germany No Drawing. Application January 13, 1931, Serial No. 508,547. In Germany January 17, 1930

4 Claims. (Cl. 167—74)

My invention relates to an oestrus exciting product and the process of making the same, and more particularly to a new stimulative substance or substances of the character set forth which products are produced from bituminous substances and similar materials in a particular manner to be described hereinafter more in detail.

As regards the stimulating effect of the new substance, the latter is like or behaves similar to the known female sexual hormone which is produced or obtained from germ-glands, placentas, liver, gall, urine, fecal substances and various other organs, secretions and excretions of human and animal bodies. A particular advantage of the novel method of using mineral substances for the purpose aimed at resides in the fact that the production of the stimulant is independent of animal products which are difficult to handle and cannot always be had in like or uniform quality. Accordingly the chief object of the invention is to dispense with the usual animal parent substances, a further object of the invention residing in the substitution therefor of substances such as bituminous and similar materials, which can readily be had in large quantities and at low cost and from which large amounts of the stimulating substance can be obtained by the process to be described hereinafter.

I have found, after much study and research, that mineral coal, lignite and certain substances produced therefrom by way of distillation, such as coal tar and lignite tar, and particularly petroleum inclusive of certain fractions resulting from the process of distilling petroleum, can be used with advantage for the production of oestrus stimulants. The present invention, however, also comprises within its purview any other bituminous substances such as bituminous shale, ozocerite or similar natural products, and preparations or substances made or derived from said products and which, if desired or preferred, may be mixed with Kieselguhr or infusorial earth prior to the treatment according to the present invention.

The treatment of the said mineral substances for the purpose of extracting therefrom oestrus stimulants is carried out, according to the present invention, in the same manner and in conformity with the method hitherto applied for the production of sexual hormones, generally speaking. The solid bituminous substances, such as coal or lignite, may be subjected for the purpose in view either immediately to the extracting treatment, or the oily constituents thereof may first be produced in the usual manner by distillation and subsequently said oily constituents may be subjected to an extracting treatment.

Various organic solvents may be used for the extracting purpose, no matter whether they are immiscible with water, such as chloroform, gasoline, ether and the like or miscible with water, such as methanol, ethanol or acetone. In the latter case the solvent is preferably used in the form of an aqueous mixture. It goes without saying that mixtures of two or more solvents may be employed for the purpose in view.

In case of using lignite as a parent substance I have found that it is advisable to treat the same beforehand with a diluted alkali or alkali-earth solution and to subsequently utilize the thus obtained alkaline solution for further treatment.

If distillates of the kind herein indicated are used for the purpose aimed at, most satisfactory yields are obtained from fractions which have been distilled off at normal pressure and at temperatures between 250° and 350° C. or at a pressure of 18 mm. mercury and at temperatures between 200° and 250° C.

In the majority of cases I subject the extracts obtained by the treatment of bituminous substances with a solvent and freed from the solvent by evaporation, to a further treatment with another solvent for extracting purposes. In some cases, however, I find it advisable and advantageous to mix the extract obtained by the treatment of the bituminous substance with an organic solvent, with a diluted solution of caustic soda, then subsequently acidulate the alkaline solution and treat the same again with an organic solvent for the extracting purpose.

Care is to be taken to employ organic solvents for the extracting purpose which possess a highest possible solving capacity respecting the oestrus exciting substance to be produced, and a least possible solving capability relative to indifferent, useless, soiling and impairing constituents of the mineral substances or the derivatives thereof to be used as parent substances as herein described. In case that the latter are of liquid nature obviously solvents only are to be used which are not thoroughly miscible therewith.

The following examples will serve to illustrate the nature of the invention but they are merely typical cases and can be varied without departure from the nature of the invention.

*Example I*

10 kg. of finely pulverized mineral coal are treated with chloroform for the extracting purpose as long as the solvent flowing off is coloured. Upon removal of the chloroform from the extract obtained by evaporation about 100 grammes of a tar-like substance are left behind and recovered which are treated with a sufficient quantity of ethylic alcohol containing about 96 per cent of pure alcohol, for solving purposes, a constituent of resinous nature remaining undissolved while the other ingredients of the tar-like substance are dissolved.

The substance which has thus passed into the alcoholic solution and amounting to about 43 grammes only, is treated with water to form an aqueous emulsion with is injected or inoculated into castrated rats. In the course of a few days the effect resulting from such injections will be apparent in the vaginal smear test suggested by Allen and Doisy, see Journal of Biological Chemistry, 1924, vol. 61, page 711. The efficiency amounts to about 200 mouse-units per gramme of extract.

*Example II*

10 kg. of lignite mixed with an adequate quantity of an aqueous 20 per cent solution of caustic soda are boiled or kept at boiling temperature for several hours.

The alkaline solution thus prepared and separated from the residual carbon by filtration is acidulated and, without regard to the precipitated sediment, shaken out with ether. The ethereal extract thus obtained is separated from the ether by evaporation. The weight of the residual substance amounts to about 22 grammes and by treating the same with aqueous methanol containing about 80 per cent of pure methanol for the extracting purpose, approximately 11 grammes of an efficient ultimate product are obtained which comprises 80 mouse-units per gramme.

*Example III*

1 kg. of Roumanian petroleum is mixed with an adequate quantity of aqueous ethanol containing 50 per cent of pure ethanol and the mixture is subjected to a shaking out operation repeatedly. The extract recovered by this operation is evaporated to a low volume and the resinous residual substance thus obtained is treated with benzol for extracting purposes. The benzolic extract thus obtained again is mixed with a diluted solution of caustic soda and shaken out exhaustively, whereupon the alkaline solution is acidulated and treated with ether for the extracting purpose.

About 15 grammes of an extract are recovered in this way whereof 1 gramme will yield or represent about 400 mouse-units when tested according to the method of Allen and Doisy referred to hereinbefore. In lieu of aqueous ethanol containing 50 per cent of pure alcohol just as well aqueous acetone containing 60 per cent of pure acetone can be used.

*Example IV*

1 kg. of a fraction obtainable from coal-tar oil distillation at a temperature between 250° and 350° C. is mixed with a like quantity of a mixture containing 3 parts of ethanol and 1 part of ether, by weight, and subsequently shaken out repeatedly. The joint alcoholic and ethereal extracts thus produced are separated from the ethanol and ether by distillation and the resulting residue is mixed and boiled with a sufficient quantity of aqueous ethanol containing 80 per cent of pure ethanol. Upon cooling the alcoholic solution is freed from the substance separated out in the form of a resin by filtration and subsequently the solution is inspissated by evaporation. The residual substance thus recovered amounts to about 5.4 grammes and represents an efficiency of 50 mouse-units per gramme when tested according to Allen and Doisy herein referred to.

*Example V*

400 grammes of the preparation produced from Russian mineral oils and named "Naphthalan" in the trade are mixed and triturated with 400 grammes of kieselguhr or mineral earth whereupon the mixture is treated successively several times in a ball-mill with a mixture of 150 parts of methanol and 50 parts of ether for extracting purposes. The fluid extracts thus produced are subjected to filtration until they are perfectly clear and subsequently freed from methanol and ether by evaporation. The weight of the residual extract amounts to about 194.5 grammes. Upon shaking the same out with methanol several times about 48 grammes of a brown highly fluorescent oily substance of an odour resembling that of mineral oils are recovered whereof one gramme comprises 100 mouse-units according to the valuation test of Allen and Doisy hereinbefore referred to.

*Example VI*

1 kg. of Russian crude mineral oil is subjected to fractional distillation in a vacuum of 18 mm. mercury. The collected fraction forming at temperatures between 200° and 250° C. is of oily nature, fluorescent and of a light colour. This product comprising about 2 mouse-units per cubic centimetre only, is to be purified by repeatedly shaking the same out with a mixture consisting of 3 parts of ethanol and 1 part of ether in the manner described in Example IV. The ultimate yield amounts to about 10 grammes of an oil having approximately ten times the efficiency of the said fraction, and which can be used immediately for the biological valuation test. By further repeating the described purification process the efficiency of the ultimate product, however, can be increased to a considerably higher degree.

The product obtainable in accordance with my improved and novel method may be utilized or applied immediately or an aqueous emulsion may be made therefrom for direct utilization or application.

The most essential feature of the products produced in accordance with the present invention, resides in the particular oestrus producing nature thereof, that is to say, the said products are endowed with oestrus provoking properties, just like the sexual hormones. In general, they are oily or semi-solid substances of light yellow to dark brown colour and of an odour resembling that of mineral oils; they have no well-definable boiling point, components thereof having a comparatively high boiling point cannot be distilled without undergoing decomposition, except in vacuo. As regards the chemical composition of the said products they are composed of carbon, hydrogen and oxygen with traces of sulphur and nitrogen only the said traces have no importance for the oestrus exciting effect. The biological valuation of the new products is accomplished in accordance with the Allen and Doisy test herein referred to.

I have herein described, for purposes of exemplification, several practical ways of carrying the invention into effect, but it will be apparent that the invention described is susceptible of realization in various other alternative ways and I therefore reserve the privilege of resorting to all such legitimate changes as may be fairly embodied or realized within the spirit and scope of the invention as claimed.

What I claim is:—

1. The process for the production of an oestrogenous substance, which comprises treating bituminous material and derivatives thereof with organic solvents, and isolating said substance from the extract obtained by said treatment.

2. The process for the production of an oestrogenous substance, which comprises treating bituminous raw material selected from a group consisting of coal, lignite and similar materials, with a diluted solution of a metal hydroxide selected from a group of metals consisting of alkali and alkaline earth metals for extracting purposes, purifying the obtained extract by filtering, acidulating, and then treating the filtrate with an organic solvent and isolating the oestrogenous substance from its solution in said organic solvent.

3. The process for the production of an oestrogenous substance, which comprises treating bituminous raw material selected from a group consisting of coal, lignite and similar materials, with a diluted solution of a metal hydroxide selected from a group of metals consisting of alkali and alkaline earth metal for extracting purposes, purifying the obtained extract by filtering, acidulating, and then treating the filtrate with an organic solvent which is immiscible with water and isolating the oestrogenous substance from its solution in said organic solvent.

4. The process for the production of an oestrogenous substance, which comprises treating bituminous material with an organic solvent which is immiscible in water, for extracting purposes, inspissating the extract thus obtained by evaporation of the solvent, and treating the residual substance with an organic solvent which is miscible with water and isolating the oestrogenous substance from its solution in said organic solvent.

SELMAR ASCHHEIM.